INVENTORS
LINDSAY M. APPLEGATE
LYMAN R. SPAULDING
BY
ATTORNEY

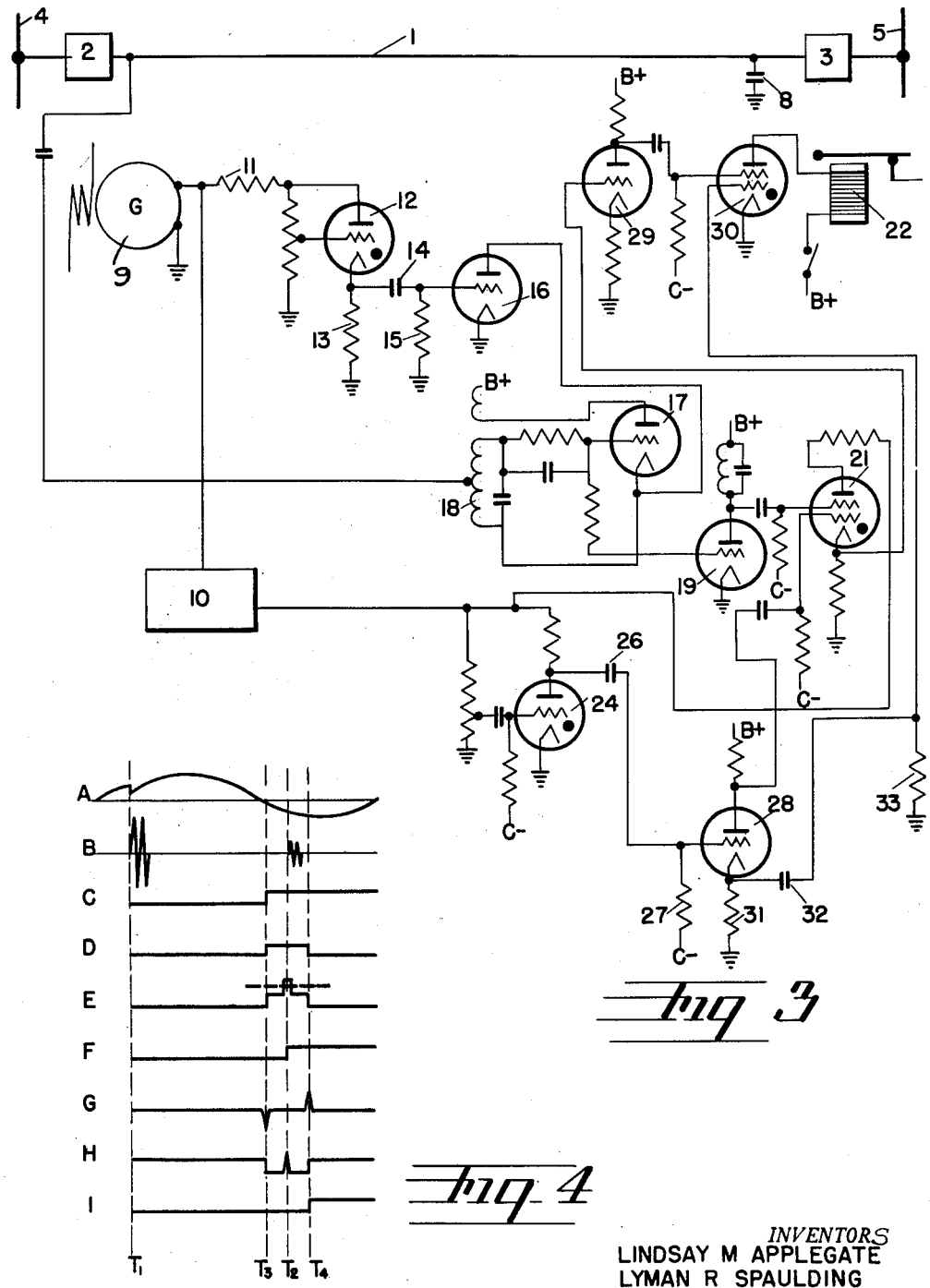

July 8, 1952 — L. M. APPLEGATE ET AL — 2,602,841
PROTECTIVE RELAY SYSTEM

Filed June 7, 1950 — 3 Sheets-Sheet 3

INVENTORS
LINDSAY M APPLEGATE
LYMAN R SPAULDING
BY
Roy C. Hackley Jr.,
ATTORNEY

Patented July 8, 1952

2,602,841

UNITED STATES PATENT OFFICE 2,602,841

PROTECTIVE RELAY SYSTEM

Lindsay M. Applegate, Portland, and Lyman Royal Spaulding, Oswego, Oreg.

Application June 7, 1950, Serial No. 166,684

9 Claims. (Cl. 175—294)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of March 3, 1883 (22 Stat. 625), as amended by the act of April 30, 1928 (45 Stat. 467, 35 U. S. C., 1946 Ed. Sec. 45).

This invention is concerned with the relay protection of electric power transmission lines. It is in a class of relaying which is either completely novel or which has had so little use as to be practically nonexistent. In the protection of electric power transmission lines, faults have been located by measuring the time taken for an electrical pulse to travel from one end of the line to the fault and back again. It is obvious that, if one of these fault locating systems could be operated continuously measuring the apparent length of the line, any appreciable decrease in apparent line length could be used as an indication of the occurrence of a line fault. This invention starts with such a conception.

The faults with which systems of this kind are concerned are power current arcs between conductors and ground or between two conductors. These power arcs are highly ionized and are of very low resistance. They are in effect short circuits between line and ground or between conductors. These arc paths are capable of reflecting transmitted pulses. Pulses impinging on these faults, if not totally reflected, are so attenuated by reflection that the energy of the pulse that passes through the fault is usually insignificant. Thus a pulse when transmitted and partly reflected by a fault may partly pass through the fault, be reflected at the far end of the line, traverse the fault in the return direction, again being partly reflected, and arrives as a greatly weakened reflection after the initial reflection from the fault, but the proportion of energy of a pulse that can traverse an arc twice and return as a reflection is negligible.

In attempting to produce a method for continuously measuring line length for the detection of fault conditions, it is necessary to differentiate between faults on the line being protected and faults on busses or lines connected thereto. In any length-measuring system this poses a question of accuracy. If, for example, a line is 200 miles long and the apparatus used is capable of measuring distance with an accuracy of 95 percent, it will be impossible to differentiate accurately between faults on the last 10 miles of the line and the first 10 miles of an interconnected line. This requires a system which can be designed with an inherently high degree of accuracy.

A protective relay system upon which the actual operation of the line depends must necessarily be more reliable and accurate than a fault locater. An error in fault location wastes time in finding the fault, but an error in relaying interrupts service unnecessarily. This requires that the relay system recognize only those disturbances to signals which are caused by actual line faults. Switching surges and other transient disturbances on the line, which may impress on the relay system impulses resembling the line measuring signals, need to be prevented from inducing false operations.

The objects of this invention include the production of means for reflective relaying on transmission lines which will fulfill the requirements mentioned above. Some objects of this invention are: to provide a relay system capable of continuously measuring the apparent length of a power line and recognizing the occurrence of a fault in a designated length of line; to provide means sufficiently accurate to recognize faults on a selected length of line and to avoid responding to faults occurring outside the protected line; and to provide means for preventing inaccurate operation of the relay system when subject to the disturbance of transients other than those due to actual line faults. What constitutes this invention is set forth in the specification following, with reference to the accompanying drawing and is succinctly defined in the appended claims.

In the drawing:

Figure 3 is a circuit diagram of a second form of embodiment of this invention including some refinements to improve operational accuracy.

Figure 4 is illustrative of the wave forms of voltages and currents and some aspects of operation at specified points in the circuit of Fig. 3.

Figures 1, 2:
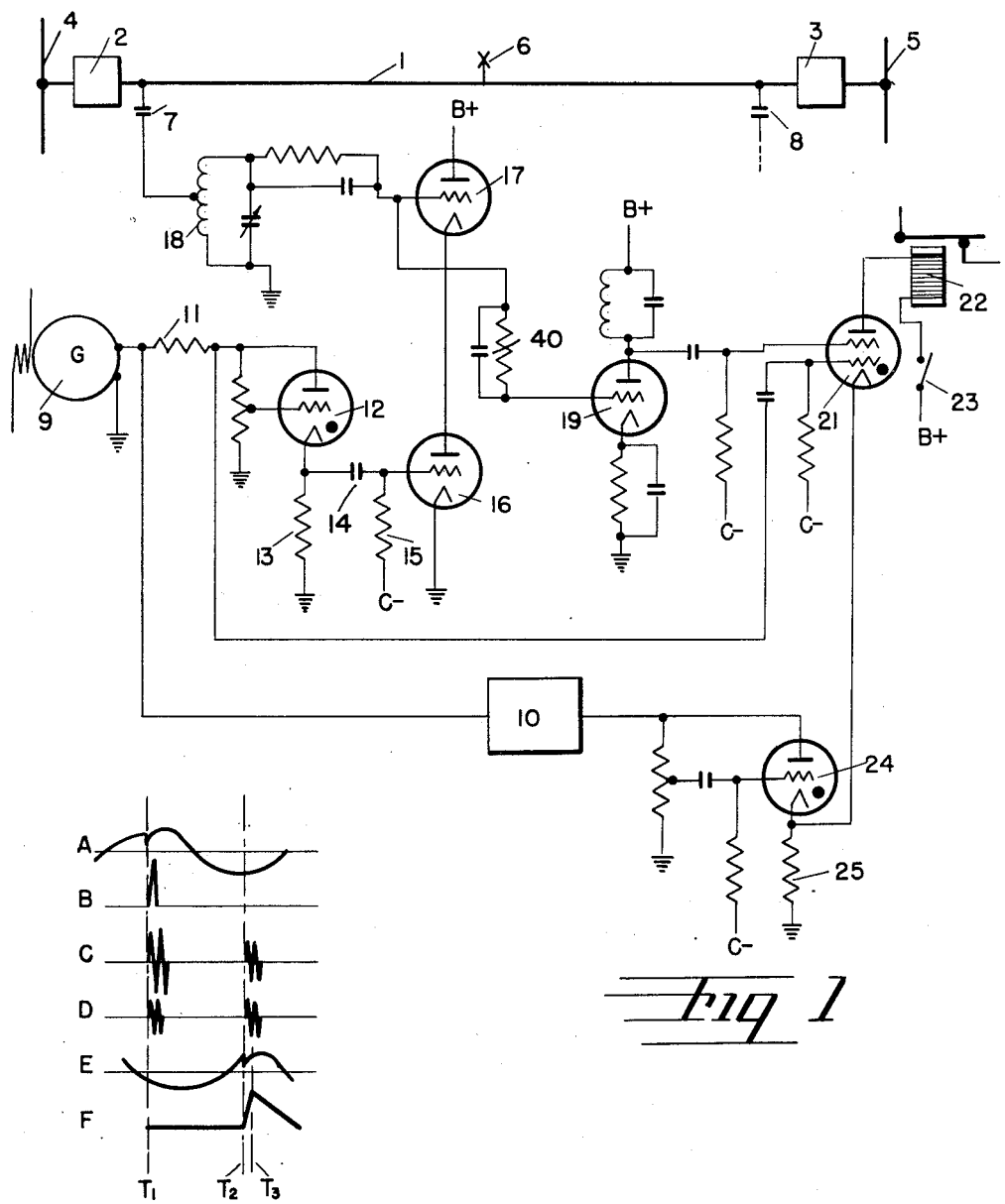
Figure 1 is a circuit diagram of a simplified form of embodiment of our present invention.
Figure 2 is a representation of the wave forms of voltages and currents in specified parts of the circuit shown in Figure 1.
Figure 5:
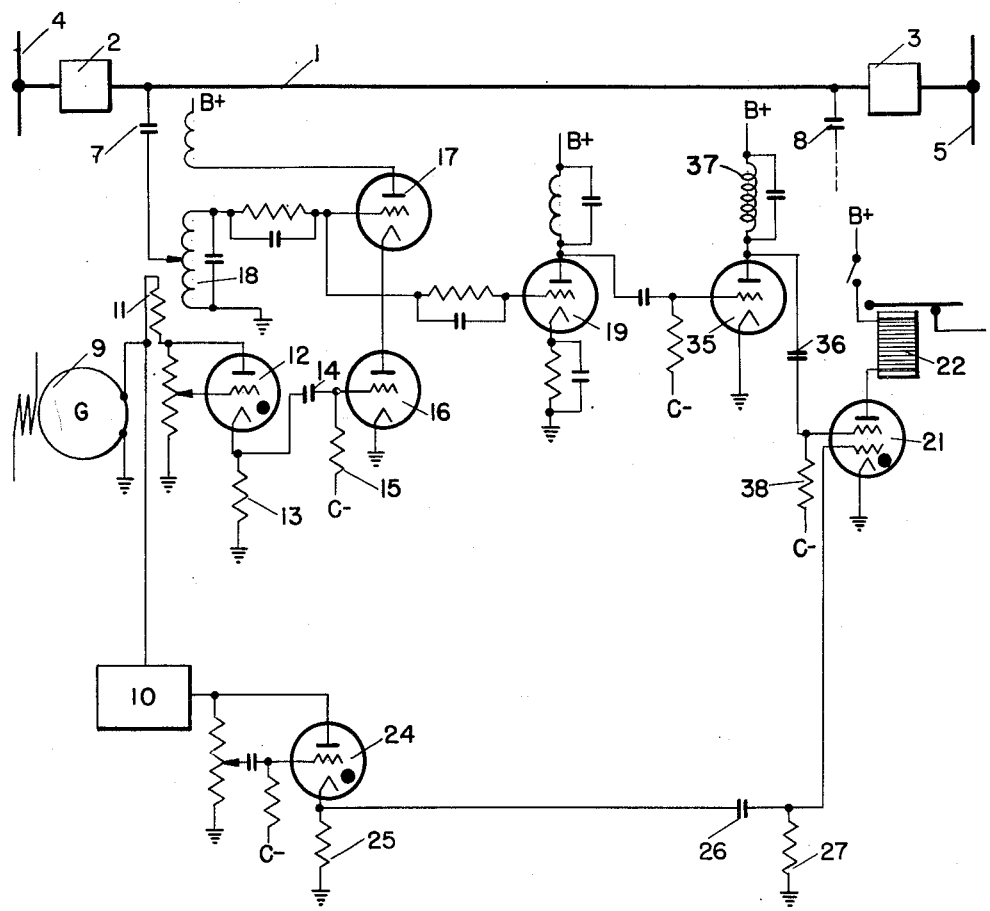
Figure 5 is a circuit diagram of a third form of embodiment of this invention.

In the description of Figures 1, 3, and 5 to follow, it will be understood that the circuit as drawn is shown for only one conductor of the transmission line which is being relayed. In a three-phase line three complete circuits would normally be used. Each circuit terminates in a tripping relay and reset switch which controls a line circuit breaker associated therewith in a conventional way. The circuit breakers for one phase of the line have been indicated. The interconnections between the tripping relay and the circuit breakers will be understood by those skilled in this art. In the drawing there are numerous electronic vacuum tubes shown, together with some of the resistors, condensers, ground connections and other details which are conventional in vacuum tube circuits. Although shown, these circuit elements are not described when their functions, with the associated tubes, are conventional and easily understood from the diagram alone. Other circuit elements that are usually used, such as wave traps, radio frequency chokes, filament current sources, bias voltage and other conventional circuit elements, are omitted as being understood as necessary by those skilled in this art.

In describing the operation of the vacuum tubes arranged to perform functions which individually are known in the related arts, such as in radar, the detailed operation of the tube is not always described. It is assumed that where the operation of tubes such as keyers, limiters, blockers, etc., are as known in the related arts, those skilled in this art will understand the operation of the individual tube from a statement of function in reference to the diagram.

Referring to Fig. 1, a transmission line 1, of which only one conductor is shown is provided with circuit breakers 2 and 3 at busses 4 and 5, respectively. A fault 6 on the line is indicated at an intermediate point. A coupling condenser 7 near circuit breaker 2 provides connection to the relay circuit which is shown only for one phase of one end of the line. A complete installation for a three-phase line would require six sets of equipment, each equivalent to that shown in Figure 1. A coupling condenser 8 at circuit breaker 3 is shown to indicate the connection for the other end of line 1.

The circuit connected to condenser 7 is intended to transmit, at intervals of about 1/500 second, short radio-frequency pulses. The pulses are reflected and are received by the relay apparatus. The receiving circuit is blocked at 500-cycle intervals so that if the reflected surge is received at a time other than that corresponding to the length of the unfaulted line the apparatus responds to the fault indication and opens the circuit breaker.

A generator 9, generating an alternating current of a frequency of the order of 500 cycles per second, is used to time the transmission of radio frequency pulses, and also in conjunction with a 500-cycle phase shifter 10 to time the response of the receiver. Generator 9 delivers power through a regulating resistor 11 to a triggering gas-filled triode 12. This tube 12, discharges or "fires" when the plate and grid potentials become positive. This occurs once in each cycle of the output of generator 9.

When tube 12 fires, a voltage positive with reference to ground is developed across a cathode resistor 13 which, through a coupling condenser 14 loaded by a grid resistor 15, applied a brief positive voltage surge to the grid of a triode 16. Condenser 14 and resistor 15 act as a differentiating circuit.

Tube 16 is biased normally to be blocked by plate current cut-off to control the operation of a triode 17 connected as an oscillator. Tube 17, when unblocked, oscillates at a frequency preferably in the range of 200 to 1000 kilocycles per second. The RC time constant of condenser 14 and resistor 15 determines the time width of the differentiated pulse transmitted to the grid of tube 16 and through tube 16 controls the length of time tube 17 oscillates for each pulse. A conventional tuned circuit 18 couples the output of tube 17 to coupling condenser 7 and therethrough to line 1.

Referring to Figure 2, the operation of the circuit thus far described is more completely explained. The voltage wave at the plate of the tube 12 has the sine wave form indicated by curve A with a notch at the point in the wave where tube 12 fires. The pulse of voltage across resistor 15 impressed on the grid of tube 16 is represented by B. The output of oscillator tube 17 is shown at the left of C.

The pulse of oscillation at the left of C is of a comparatively large magnitude. This pulse is reflected producing a pulse of lesser magnitude indicated, but not to scale, at the right of C. Neither the transmitted nor the received pulses illustrated at C are to scale either as to magnitude or the number of cycles of high frequency that are transmitted. If the transmitted frequency is very high, there will be several cycles in each pulse but a frequency may be selected to produce only the minimum number of cycles necessary for oscillator 17 to build up full strength oscillation. As an example of a practical solution, a frequency of the order of 200,000 per second and a pulse length of about 40 microseconds are practicable.

During the operation of oscillator 17 a radio-frequency signal is impressed through an RC network 40 on the grid of a triode 19. Triode 19, acting as an amplifier for small pulses and as a limiter for large pulses, is set so that no pulse larger than that of a predetermined value will be delivered. The output of a triode 19 is delivered in a conventional way to a gas-filled tetrode, or thyratron 21. Thyratron 21 is connected to operate a tripping relay 22. Relay 22 is connected in a conventional way to open circuit breaker 2. A reset switch 23 opens when circuit breaker 2 opens and closes when the circuit breaker is closed. Triode 19 delivers a signal of the form shown at D in Figure 2. This output is limited by triode 19 to a value which will not fire thyratron 21 except at those times when the other grid voltage in thyratron 21 and the cathode voltage therein have attained certain values.

The 500-cycle alternating current delivered by generator 9, besides being impressed on that part of the system already described, is delivered to a gas-filled triode, or thyratron 24 connected to act as a blocking tube. The form of the voltage delivered by phase shifter 10 is shown at E in Figure 2. Phase shifter 10 is set so that tube 24 which fires just after the cycle turns positive is timed to fire just before the normal reflected pulse returns from the other end of the line. This is indicated by the momentary dip in voltage indicated in curve E in Fig. 2. The cathode current of tube 24 is shown at F in Fig. 2. The cathode current is held at zero until the appropriate time for firing tube 24 at which time a surge of current as shown at F is produced.

The current surge as shown at F produces a voltage in a cathode resistor 25 which is positive with respect to ground. This increases the negative grid bias on tube 21 momentarily blocking it from firing regardless of any signal received. The exploring pulse shown at the left in C is sent at time $T_1$. The normal time of return of the pulse reflected from the other end of the line is $T_2$. Tube 21 is blocked by tube 24 during the time interval $T_2$ to $T_3$. If the reflected pulse returns between $T_1$ and $T_2$ or after $T_3$, such as occurs if fault 6 becomes a reality, tube 21 fires and trips circuit breaker 2.

This arrangement, therefore, will trip for any pulse reflection other than at the time pertaining to unfaulted and normal line conditions. Thus, this arrangement can be tripped by faults beyond circuit breaker 3 such as on any other line that may be connected to bus 5 unless adequate impedance for reflection is provided between circuit breaker 3 and bus 5. The inherent accuracy of this system depends on the precision with which the times $T_2$ and $T_3$ can be determined. The closer $T_2$ approaches $T_3$ the less the length of line at this bus end in which protection is uncertain. The pulse on the transmission line travels at about the speed of light and traverses about one fifth of a mile in one microsecond. If tubes 21 and 24 are adjusted so tube 21 is blocked for 10 microseconds each cycle, the protection will be uncertain for about three miles. This inherent limitation, applying to a small percentage of the average line is overcome by using additional conventional relays to operate when this system does not operate. With the supplementary relays, the circuit breaker near the fault would be opened quickly and the remote circuit breaker opened with a conventional time delay.

The system shown in Figure 1 is subject to operation by pulses resembling the normally reflected pulse but originating from lightning or other causes. This difficulty is eliminated in a second and more highly developed embodiment of our invention shown in Figure 3. The arrangement shown in Figure 1 also has the disadvantage of responding to pulses reflected by fault from other lines connected to the busses. These disadvantages are overcome by the arrangements shown in Figures 3 and 5 whose description will follow.

In Figure 3, elements have been identified to as great an extent as possible by numerals which have the same significance as in Figure 1. Those elements shown both in Figures 1 and 3 operate in the same way in both diagrams although their operations are modified in important respects by additional elements.

The sequence of blocking operations in Figure 3 differs from that of Figure 1. When the 500-cycle voltage of generator 9 becomes sufficiently positive as in Figure 1, tube 12 fires as indicated by sine wave A at time $T_1$ in Figure 4. A radio-frequency pulse is transmitted as shown at the left of B in Figure 4 by tube 17, also as in Figure 1. With the further advance of phase of the 500-cycle wave, tube 24 fires at a time $T_3$ which is set to be a short interval of time, for example about 10 microseconds, prior to time $T_2$ when the reflected pulse will return from the other end of the line if the line is unfaulted as shown at the right of B in Figure 4. The firing of tube 24 is indicated in C in Figure 4. Tube 24 continues to carry current until the 500-cycle voltage on the plate thereof becomes negative.

This action is described in conventional language as producing a negative gate on the plate of tube 24 which lasts until the plate voltage on tube 24 becomes negative. The leading edge of this negative gate is differentiated and clipped by a condenser 26 and resistor 27 acting as a differentiating circuit. The clipped differentiated gate is made to last until time $T_4$ which is about the same interval of time after $T_2$ as time $T_3$ is before $T_2$. This clipped gate is inverted by an amplifying triode tube 28 and delivered to one of the grids of thyratron gas tube 21. The plate voltage of tube 28 is shown at D in Figure 4.

The amplified clipped gate from tube 28 on the grid of tube 21 is in the direction but it is of insufficient voltage to fire tube 21. This is indicated at E in which the broken line above the gate indicates the voltage necessary for firing tube 21. If the line is unfaulted, the reflection of the transmitted pulse returns at $T_2$ and is received and amplified by tube 19 which impresses a positive signal on the second grid of tube 21 which has the effect of adding a voltage to that provided by tube 28 as indicated in E, Figure 4. These two voltages acting concurrently cause tube 21 to fire. When tube 21 fires, a positive gate is placed on the grid of a triode amplifying tube 29 which in turn impresses a negative gate on one of the grids of a thyratron tube 30. It will be noticed here that whereas in Figure 1, tube 21 is used to operate the tripping relay 22, tube 21 in Figure 3 controls only an amplifier, tube 29, and while similar in principle, can be conveniently of a lesser power rating. The tripping is now done by tube 30 which would normally call for a larger tube.

At time $T_3$ when tube 24 fired, and when tube 28 delivered the clipped positive gate to the first grid of tube 21, tube 28 also delivered a negative gate across a cathode resistor 31 to a differentiating circuit comprising condenser 32 and 33 which impresses first a negative pulse at time $T_3$ and later a positive pulse at time $T_4$ to one of the grids of tube 30. This is indicated at G in Figure 4. Tube 21, once fired continues to fire until a reversal of the 500-cycle voltage. This carries the firing of tube 21 beyond the time $T_4$ which is some 10 microseconds after the time when the reflected pulse was due. At time $T_4$ when the positive pulse arrives from tube 28, tube 30 is not disturbed because the pulse from tube 28 being opposed by the negative gate from tube 21 is insufficient in voltage to fire tube 30. This is indicated at H in Figure 4.

If the line is faulted, the reflection of the transmitted pulse will return prior to time $T_2$, taking account of the unprotected length of line corresponding to time $T_2$ minus $T_3$, prior actually to $T_3$. Thus with the line faulted tube 21 will not have fired because the returning pulse alone without the positive gate at $T_3$ from tube 28 is insufficient. Without tube 21 firing to suppress the effect of the positive pulse from tube 28, tube 30 will be fired at time $T_4$ as indicated at I in Figure 4, opening circuit breaker 2.

The system just described will always open the circuit breaker unless the reflected pulse arrives at the correct time for a normal line, that is between the times $T_3$ and $T_4$. The precise time of arrival, other than normal, of the reflected pulse has no significance; it is the absence of the reflection at the normal time that controls the system. Thus any pulse received at any other time, such as lightning surges or other disturbances originating either inside or outside the line will not cause the system to operate. If a surge were to arrive during the time between $T_3$ and $T_4$ at a time when the line was faulted, and if this prevented proper relay operation, the system would operate correctly at the next cycle, one-five-hundredth of a second later unless there were another spurious pulse at the same part of the cycle as before. This is extremely improbable. The reliability of operation of this arrangement assumes that when the line is faulted, the strength of the transmitted pulse is sufficiently reflected by the fault to leave a negligible amount of pulse energy that can traverse the fault, travel to the end of the line, be reflected, traverse the fault again and arrive at the normal time. This assumption is substantially correct due to the practically short circuit characteristics of most faults.

Figure 5 shows a system which combines some of the features of Figs. 1 and 3. When the 500-cycle wave of generator 9 becomes positive as shown at A in Figure 6, tube 12 fires. This triggers tube 16 which permits tube 17 to oscillate for a few microseconds transmitting a radio frequency pulse to line 1 as shown at the left of B in Figure 6. The reflection, at the right of B in Figure 6 returns at the time indicated if the line is not in fault.

The received reflection is either amplified or limited by tube 19 which transmits a limited reproduction of the received pulse to another amplifying tube 35. This is indicated in C, Figure 6. Tube 35 is biased to cut off so it conducts only during the time when it is receiving pulse signals. The output of tube 35 is delivered to thyratron tube 21 through a condenser 36 which together with an LC circuit 37 in the plate supply and a grid input resistor 38 acts as an integrating circuit. The form of the integrated signal applied to the grid of tube 21 by tube 35 is shown at D in Figure 6.

Phase shifter 10 is set to fire tube 24 just after the correct time for the reception of the reflected pulse in the normal unfaulted line. The plate current of tube 24 is shown at E in Figure 6. The plate signal of tube 24 is differentiated by the combination of condenser 26 and resistor 27 so that a positive surge of brief duration, commonly referred to as a "pip" as shown in F, Figure 6, is applied to the grid of tube 21.

Figure 6:
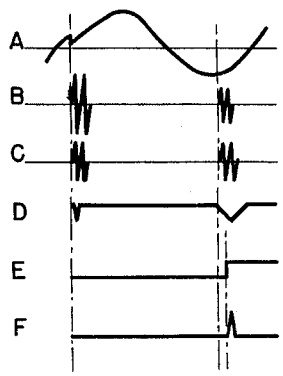
Figure 6 is illustrative of voltages and currents in the circuit of Figure 5 and is illustrative of some aspects of operation thereof.

This positive pip will fire tube 21 unless the negative blocking signal shown at the right in D, Fig. 6, is present on the other grid of tube 21. That is tube 21 will fire if the reflected pulse does not arrive at the right time. Functionally this arrangement is similar in over-all characteristics to that shown in Figure 3 although the structure is different in some respects.

The three arrangements, Figures 1, 3, and 5 all fulfill the same general objective of clearing a line in fault in a length of time, following occurrence of a fault, corresponding to one cycle of a 500-cycle generator. This is about ten times faster than the conventional power system relays which usually require at least one cycle in a 50 or 60-cycle system. Figures 3 and 5 are developments of the basic system illustrated in Fig. 1. Other developments of the invention are practicable within the principal characteristics of the invention for which we claim:

1. For the protection of electric power transmission lines the method which consists of continuously transmitting from one end of the line, periodically spaced electrical pulses of radio frequency, receiving at the transmitting end pulse reflections of said transmitted pulses, comparing the actual time of reception of said reflected pulses with the time such reflected pulses are received under normal unfaulted conditions in which the pulses are reflected from the other end of the line, and causing the line to be opened when the time said pulses are actually received is appreciably different from the time corresponding to the time they are received under normal conditions.

2. For the protection of electric power transmission lines the method which consists of continuously transmitting from one end of the line periodically spaced electrical pulses of radio frequency, receiving at the same end of the line pulse reflections of said transmitted pulses, establishing a time corresponding to that at which said reflection is received after traversing the entire length of line under normal conditions, correlating this time with the arrival or non-arrival of said pulse at that time, recognizing said non-arrival when said pulse arrives ahead of time under fault conditions, and opening said line when said reflection is not received at the normal time.

3. In electric power transmission line protection, the combination of means for electrically pulsing said line with brief pulses of radio frequency, means for receiving pulse reflections of said pulses from said line, means for deriving from said pulses signals timed to correspond with the predetermined time of reception of said pulse reflections under normal unfaulted conditions of the line, and means for opening said line in response to departure of the timing of reception of said reflections from said predetermined timing.

4. In electric power transmission line protection, the combination of means for electrically pulsing said line with brief pulses of radio frequency, means for receiving pulse reflections of said pulses from said line, means for deriving from said pulses signals timed to correspond with the predetermined time of reception of said pulse reflections under normal unfaulted conditions of the line, and means for opening said line in response to said reflections on departure of the timing of reception of said reflections from said predetermined timing.

5. In electric power transmission line protection, the combination of means for electrically pulsing said line with brief pulses of radio frequency, means for receiving pulse reflections of said pulses from said line, means for deriving from said pulses signals timed to correspond with the predetermined time of reception of said pulse reflections under normal unfaulted conditions of the line, and means for opening said line in response to said signals on departure of the timing of reception of said reflections from said predetermined timing.

6. In electric power transmission line protection the combination of means for transmitting periodically timed radio frequency pulses on said line, means for receiving pulse reflections of said pulses, means for opening said line at a time corresponding to the normal time of arrival of a pulse reflected from the remote end of the line when normal and unfaulted, and means for preventing said line opening when said pulse actually arrives at the normal time.

7. In electric power transmission line protection, means for transmitting on a line brief radio frequency pulses at intervals of a few thousandths of a second, means for receiving pulse reflections of said pulses, means for rendering said receiving means insensitive at all times except at a brief interval set to be at the time corresponding to the normal time of arrival of reflected pulses when the line is normal and unfaulted, and means for causing said receiving means to open the line at said normal time if said reflected pulse does not arrive during said brief interval of time.

8. For the protection of an electric power transmission line, the method comprising the steps of generating an alternating current of a period of the order of, and greater than, the time required for an electric wave to traverse twice the length of a transmission line associated therewith, generating a short train of radio frequency waves at a predetermined time in each cycle of said alternating current, transmitting said train of waves on said line and receiving therefrom the reflection of said waves, blocking the reception of said waves at the time in each cycle of said alternating current corresponding to the time said reflections are received when reflected over the entire length of said line, unblocking said reception at all other times in said cycle of alternating current, and causing the signal to initiate protective measures in said line, when received during the unblocked time.

9. For the protection of electric power transmission lines, the method comprising the steps of generating an alternating current of a period of the order of and greater than the time required for an electric wave to traverse twice the length of a transmission line associated therewith, generating a short train of radio frequency waves at a predetermined time in each cycle of said alternating current, transmitting said train of waves on said line and receiving therefrom the reflection of said waves, blocking the reception of said waves at all times except the time of return of reflected waves in a normal unfaulted line, unblocking reception during a time from just before to just after the time the reflection is received in an unfaulted line, generating an operating current during said unblocked time for initiating protective measures in said line, suppressing said operating current by the reception of said reflected waves during said unblocked time and permitting said operating current to initiate protective measures if said reflected waves are not received during said unblocked time.

LINDSAY M. APPLEGATE.
LYMAN ROYAL SPAULDING.

REFERENCES CITED

The following references are of record in the file of this patent:

UNITED STATES PATENTS

| Number | Name | Date |
|---|---|---|
| 2,253,975 | Guanella | Aug. 26, 1941 |
| 2,268,587 | Guanella | Jan. 6, 1942 |
| 2,315,383 | Andrews | Mar. 30, 1943 |
| 2,315,450 | Nyquist | Mar. 30, 1943 |
| 2,345,932 | Gould | Apr. 4, 1944 |

FOREIGN PATENTS

| Number | Country | Date |
|---|---|---|
| 261,496 | Great Britain | Nov. 25, 1926 |